Oct. 26, 1965  I. A. CAPUANO ETAL  3,214,354
MEASUREMENT OF CATALYST ACTIVITY
Filed July 24, 1961  3 Sheets-Sheet 1

INVENTORS
ITALO A. CAPUANO
MARVIN D. WEISS
BY Leo A. Plum, Jr.
ATTORNEY

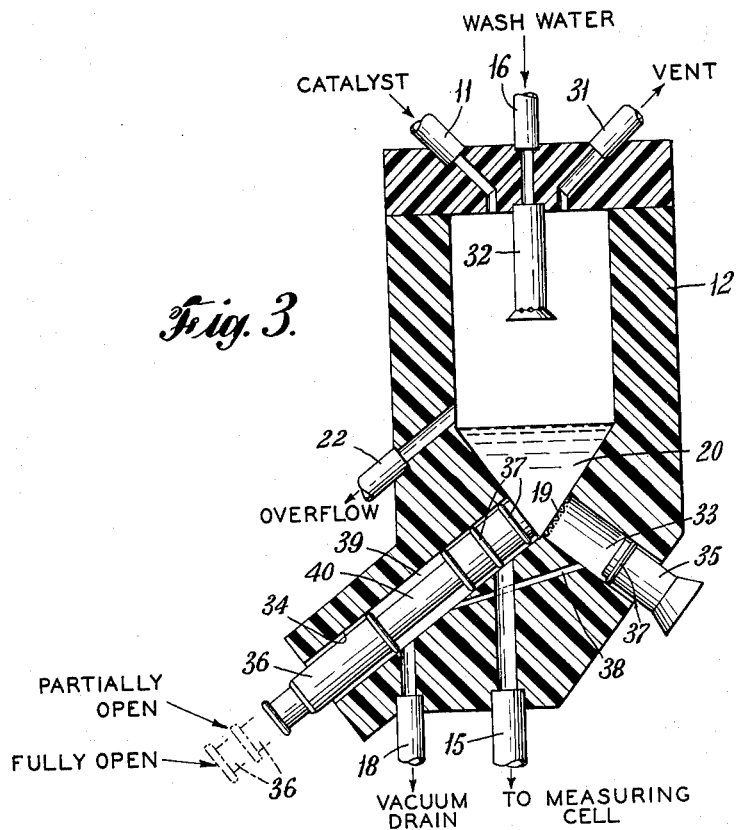

United States Patent Office 3,214,354
Patented Oct. 26, 1965

3,214,354
MEASUREMENT OF CATALYST ACTIVITY
Italo A. Capuano, St. Albans, and Marvin D. Weiss, Charleston, W. Va., assignors to Union Carbide Corporation, a corporation of New York
Filed July 24, 1961, Ser. No. 126,305
6 Claims. (Cl. 204—1)

This invention relates to a method and apparatus for measuring the activity of a finely divided solid catalyst used to assist the reaction between a liquid and a gas.

In order to control the efficiency of a chemical reaction wherein a catalyst is used, it is necessary to know the activity of the catalyst during the course of the reaction. Such determinations are normally made by measuring the extent of the chemical reaction during a trial run. It is readily apparent that a rapid, precise method for directly measuring catalyst activity would be of great value to the chemical process industry. This would be particularly true if such a process were capable of continuous analysis of the activity of a catalyst in a plant stream.

Raney nickel catalyst composed of nickel in a finely divided state is a particularly useful catalyst because of its ability to absorb a large quantity of hydrogen gas and render it active. Like many other catalysts, Raney nickel can lose its activity if poisoned. A means for determining the activity of such a catalyst would be of great use.

It is the primary object of this invention to provide a method and apparatus for measuring the activity of a finely divided solid catalyst.

It is further an object of this invention to provide a method and apparatus for measuring the activity of Raney nickel catalyst.

Other aims and advantages of the invention will be apparent from the following description and the appended claims.

In the drawings:

FIG. 3 is an elevational section of the sampling chamber of the apparatus;

FIG. 4 is a graph showing programming of the apparatus.

Figure 1:
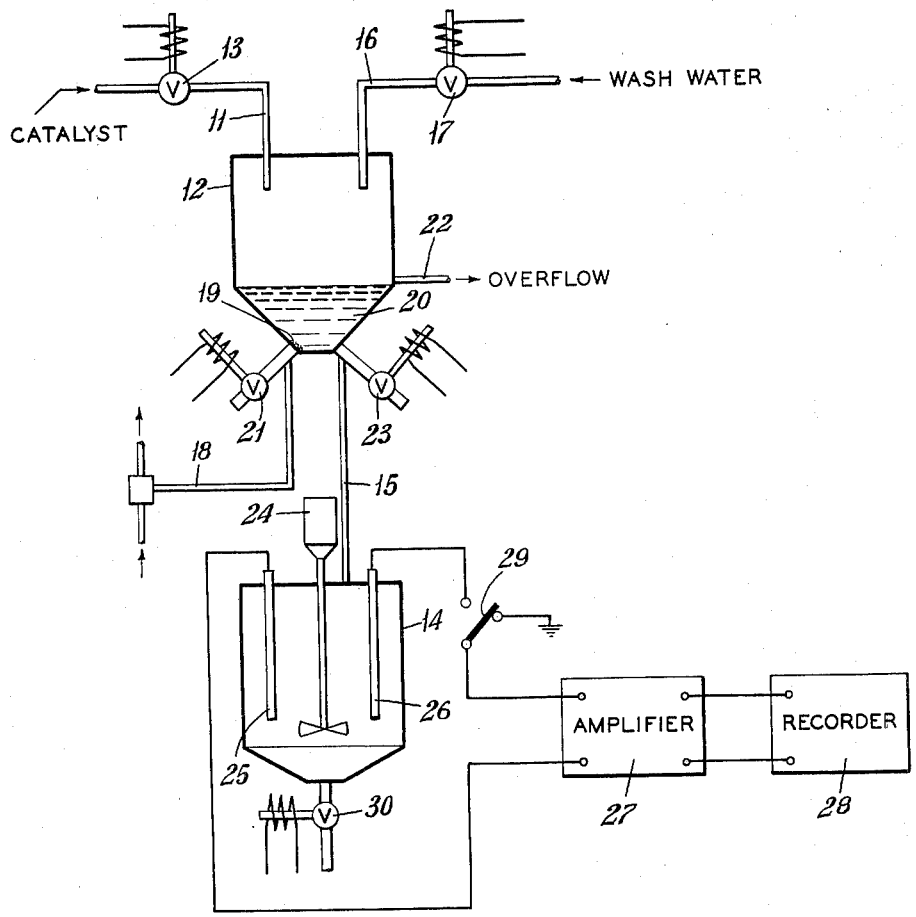
FIG. 1 is a schematic representation of the apparatus for continuously measuring the activity of a catalyst sample taken from a reactor stream.

In accordance with these objects a method is provided for measuring the activity of a finely-divided solid catalyst comprising providing a slurry of the finely-divided catalyst whose activity is to be measured in an inert liquid medium, immersing in the slurry an oxidation-reduction pair consisting of a measuring electrode having an affinity for the gas to be adsorbed on the catalyst and a second reference electrode, and measuring the voltage produced by said oxidation-reduction pair as a measurement of the activity of the finely-divided solid catalyst.

Raney nickel catalyst, for example, is useful for liquid phase hydrogenation reactions because of its ability to adsorb large quantities of hydrogen. The activity of a catalyst sample taken from a hydrogenation process stream is a function of the hydrogen concentration actually on the metal surface. By taking such a catalyst sample and mixing it in an inert liquid medium in an electrolytic measurement cell and immersing therein an electrode pair, an E.M.F. is generated which is proportional to the amount of hydrogen actually present on the catalyst surface. The voltage generated is an indication of the catalyst activity. This E.M.F. can be indicated on a voltage measurement device.

The finely divided catalyst contains on its surface atoms or ions of the gaseous phase to be analyzed. By an oxidation-reduction reaction electrons are transferred from the gaseous atom on the catalyst to the measuring electrode, thereby providing ions from this gas. A second, reference, electrode is required to allow the passage of the transferred electron back to the solution by means of a second oxidation-reduction reaction. The tendency of electrons to flow from the measuring electrode to the reference electrode is measured by an appropriate potentiometer circuit. The voltage which appears between these electrodes is a measurement of the amount of gas contained on the surface of the catalyst which in turn is related to the activity of the catalyst.

The measuring electrode is of a metal which has a high affinity for gas which is adsorbed on the catalyst being measured. If the catalyst to be tested is a hydrogenation catalyst, as in the discussion involving Raney nickel catalyst, then the measuring electrode would be platinum or any metal with high affinity for hydrogen. If the catalyst was an oxidation catalyst and the measurement were to be of the oxygen concentration on the catalyst, then a silver measuring electrode would be used, or any other metal with high affinity for oxygen. The invention herein is generally described in reference to the measurement of the activity of a Raney nickel catalyst but is not limited thereto. Additionally the process of the invention is not limited to measurement of the activity of metal catalysts but will measure the activity of any other finely divided or surface active catalyst.

The reference electrode is one which produces an appreciable electrode potential above that of the measuring electrode. A calomel electrode has been found satisfactory.

The cell for containing the catalyst and inert liquid dispersive medium and measuring electrodes may be of any design but is preferably of the type described herein and shown schematically in the drawings whereby a continuous batch type measurement of catalyst can be periodically conducted.

The inert liquid dispersive medium does not take part in the cell reaction and so its composition is not critical. Distilled water is used herein but other liquids having an appreciable conductivity may also be used. The catalyst sample to be analyzed must be free from foreign materials like acids, bases, etc., which would change the conductivity in the cell. For this reason the catalyst slurry from the process stream is first washed free of slurry liquids and impurities to a neutral pH before it is introduced into the measurement cell. Distilled water is used herein as the catalyst wash and dispersive medium. As stated above, however, any liquid or solution of appreciable conductivity and inert to the measurement can be used as the wash and dispersive medium.

The voltage measurement can be made by any device for measuring the potential of electrochemical cells, e.g., electrometer tube, pH meter, or high impedance vacuum tube voltmeter. A preferred arrangement consists of the voltage amplifier and bar graph recorder shown in the drawings.

In the measuring step of the process the Raney nickel activity is measured by a redox type measurement in which the electrochemical reactions responsible for the electrical potential are believed to be as follows:

$H_2 \rightarrow 2H^+ + 2e$ (oxidation)
$Hg_2Cl_2 + 2e \rightarrow 2Hg° + 2Cl^-$ (reduction)

One mole of hydrogen from the catalyst on approaching the platinum electrode is oxidized to form two protons and two electrons which flow through the circuit as indicated by the voltmeter, and upon reaching the calomel electrode are accepted by the mercurous ions from the mercurous chloride in the electrode, reducing the latter to metallic mercury and forming chloride ions.

As an example of the practice of the invention, several samples of Raney nickel catalyst were measured for catalytic activity. Each sample had a different degree of activity for hydrogen as determined by separately performed chemical reactions. Increasing amounts of the most active catalyst, Catalyst A, were mixed with distilled water and tested in a cell of the type described herein with a platinum measuring electrode and saturated calomel reference electrode. The following voltage readings were taken:

| Grams of Catalyst A: | Voltage reading |
|---|---|
| 0 | 0.000 |
| 2 | 0.310 |
| 4 | 0.400 |
| 6 | 0.448 |
| 8 | 0.490 |

The less active catalyst sample, Catalyst B, was similarly tested and the following voltages recorded:

| Grams of Catalyst B: | Voltage reading |
|---|---|
| 0 | 0.000 |
| 2 | 0.238 |
| 4 | 0.360 |
| 6 | 0.413 |
| 8 | 0.468 |

The third and least active sample, Catalyst C, was also tested and the following voltages recorded:

| Grams of Catalyst C: | Voltage reading |
|---|---|
| 0 | 0.000 |
| 2 | 0.200 |
| 4 | 0.298 |
| 6 | 0.350 |
| 8 | 0.398 |

Figure 2:
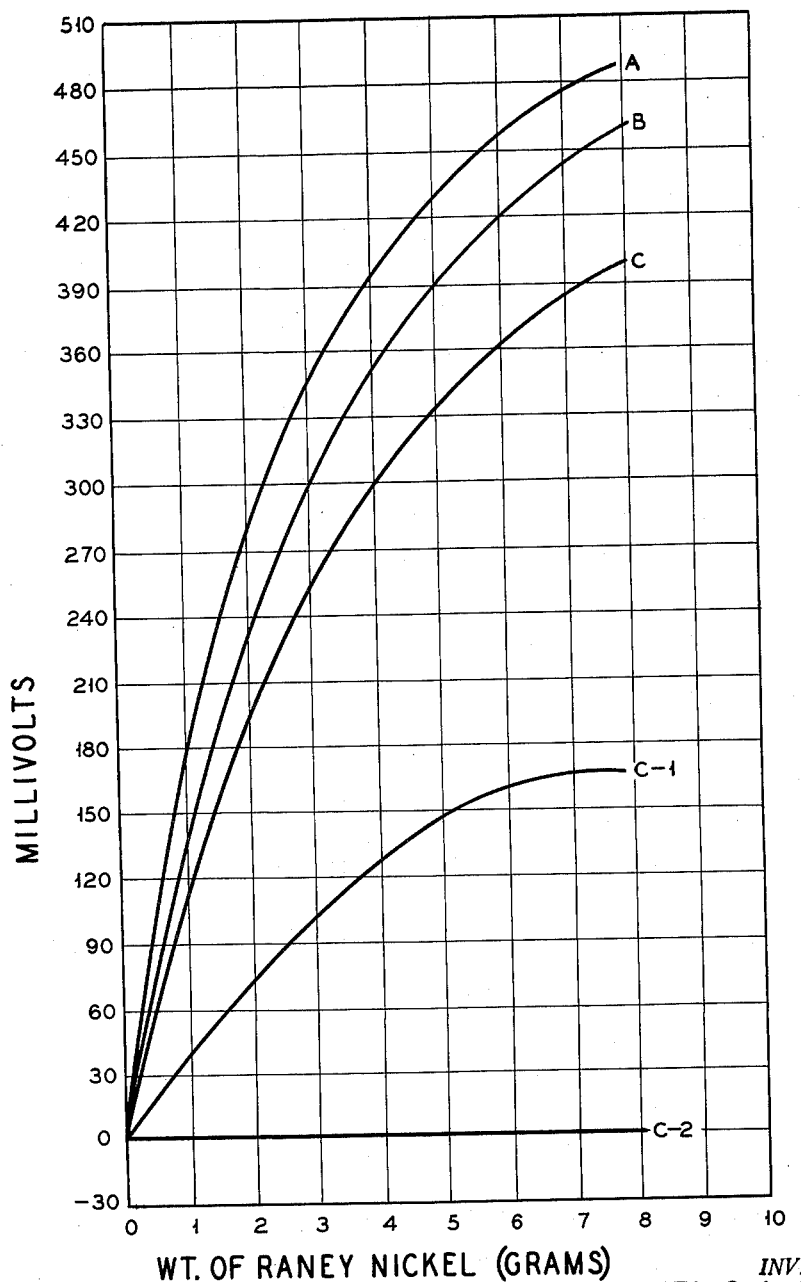
FIG. 2 is a graph showing correlation between the weight of catalysts of different activity and the E.M.F. generated by an electrode according to this invention.

In FIG. 2 a graph of these voltage readings against grams of the different catalysts shows the clear relationship between the two.

Also shown in FIG. 2 are the activity curves of the Catalyst C sample after this sample had been further deactivated (1) by burning the adsorbed hydrogen in oxygen, Catalyst C–1; and (2) after being completely deactivated by heating in a vacuum, Catalyst C–2. The voltage readings for Catalysts C–1 and C–2 are as follows:

| Grams of partially deactivated Catalyst C–1: | Voltage reading |
|---|---|
| 0 | 0.000 |
| 2 | 0.055 |
| 4 | 0.125 |
| 6 | 0.155 |
| 8 | 0.165 |

| Grams of completely deactivated Catalyst C–2: | |
|---|---|
| 0 | 0.000 |
| 2 | 0.000 |
| 4 | 0.000 |
| 6 | 0.000 |
| 8 | 0.000 |

The excellent correlation between the amount and degree of activation of the catalyst sample and the voltage readings demonstrates the effectiveness of the invention.

While the measurement process can be carried out in a simple cell, it is proposed to continuously measure the catalyst activity of samples of catalyst taken from a reactor at successive intervals thereby giving a continuous indication at catalytic activity. Such a process is performed by the apparatus of FIG. 1 wherein a sample of catalyst slurry is periodically taken from the process stream, washed, metered to a standard amount, tested for activity and discharged from the apparatus so that a new sample can be tested.

In FIG. 1 the catalyst to be measured for activity is transported from a process stream as a catalyst slurry to an inlet 11 to a sampling chamber 12. An inlet valve 13 controls the addition of catalyst slurry to the sampling chamber 12 so that a constant amount of catalyst slurry can be injected into the measuring apparatus periodically. The purpose of the sampling chamber 12 is to wash the catalyst sample free of slurry liquids and also to provide a metered portion of clean catalyst to the measurement cell 14 through the sampling chamber catalyst outlet 15. To accomplish the washing and metering of the catalysts, the sampling chamber 12 is provided with a wash water inlet 16 with wash water controlling valve 17 and a wash water and slurry drain 18 covered by a fine filter screen 19 over the mouth of the drain so that the wash water and slurry liquids will drain off leaving the catalyst on the screen in the cone-shaped catalyst collection zone 20 of the sampling chamber when the drain valve 21 is open. A slight vacuum can be applied to the drain line so that the liquid in the catalyst slurry will be drawn through the filter screen 19 and out through this vacuum line. A water aspirator can be used to apply the vacuum as shown in the drawing. The sampling chamber also has an overflow 22 and a catalyst outlet 15 controlled by outlet valve 23 through which the washed, metered amounts of catalyst pass to the measuring cell 14.

In operation an excess of catalyst slurry from a process stream is injected into the sampling chamber 12 by opening the inlet valve 13. The drain valve 21 is also open allowing the fluid of the catalyst slurry to drain off leaving catalyst on the screen 19 filling the cone shaped zone 20. The catalyst slurry inlet valve 13 is then closed and wash water is admitted through inlet 16 by opening valve 17 while keeping the drain valve 21 open so that some of the wash water passes through the catalyst and passes down the drain while the excess of wash water passes out the overflow 22 leaving a nearly constant volume of washed catalyst in the sampling chamber.

With the wash water inlet valve 17 still open, the drain valve 21 is then closed and catalyst outlet valve 23 is opened allowing the metered portion of washed catalyst to enter the catalyst outlet 15 and pass into the measuring cell 14. The wash water still entering the sampling chamber 12 washes any remaining catalyst from the walls of that chamber down into the catalyst outlet 15 and into the measuring cell 14. This flow of water is maintained until the measuring cell is full. A stirrer, 24 preferably pneumatically driven, keeps the mixture of catalyst and water agitated in the measuring cell 14 to provide a relatively homogeneous mixture.

The measuring cell 14 contains a platinum electrode 25 and a saturated calomel electrode 26 electrically connected to a amplifier 27 and recorder 28 through switch 29. When switch 29 is closed, completing the circuit, the catalyst activity of the sample is measured, amplified, and recorded by the recorder as a bar graph, for example.

After a measurement has been completed, the switch 29 is opened and the drain valve 30 is opened so that the sample is drained out of the measuring cell to prepare it for the next batch of catalyst to be sampled. At this time a flushing of the apparatus is accomplished by opening the wash water valve 17 and catalyst outlet valve 23 so that wash water again enters and flushes the sampling chamber 12, outlet tube 15 and measuring cell 14. The measuring cell drain valve 30 is then closed allowing the water to fill the measuring cell with the stirrer 24 operating to wash any residual catalyst from the walls of the cell. The measuring cell drain 30 is then opened and after a final flush of the system, the wash water inlet valve 17 is closed followed by the catalyst outlet valve 23 and measuring cell drain valve 30. The apparatus is then ready for the introduction of a new batch of catalyst slurry for activity measurement.

An air-driven stirrer is employed to disperse the catalyst through the inert liquid medium rather than a magnetic stirrer because the magnetic properties of the nickel would prevent homogeneous mixing.

Since the distilled water dispersing medium has some conductivity, giving a potential of about 280 millivolts, the amplifier and recorder are zeroed to compensate for this before a catalyst sample in water is measured for activity.

In FIG. 3 a specific arrangement of the sampling chamber 12 is shown wherein the catalyst slurry inlet 11 and wash water inlet 16 are shown along with a vent 31. The wash water inlet 16 terminates in a spray nozzle 32 whereby the walls of the chamber are effectively washed. The cone-shaped catalyst collection zone 20 has openings for a drain tube 18 and catalyst outlet 15 as in the schematic of FIG. 1 but in a reversed position. In the conduit communicating with each opening 33 and 34 is a slideable plug, 35 and 36, sealed against leakage by suitable sealing rings 37. The opening in the drain conduit 33 is covered by a fine filter screen 19 whereby only fluids may pass into the drain conduit 33. A conduit 38 in the chamber body provides communication between the drain conduit 33 and an intermediate portion 39 of the catalyst outlet conduit 34 where a constricted portion 40 of the fully inserted catalyst outlet plug 36 allows the flow of fluids from the drain conduit 33 through the conduit 38 into the intermediate portion 39 and out the drain line 18. In this position of the catalyst drain plug 36, the drain is open. However when the catalyst sample plug is partially withdrawn from the conduit to the position indicated by the dotted line marked "partially opened," the drain is closed off because conduit 38 no longer communicates with the intermediate portion of the catalyst sample conduit 34. When the catalyst sample plug 36 is further withdrawn to the position of the dotted line marked, "fully opened," then the catalyst outlet 15 is open to the chamber for passage of catalyst sample to the measuring chamber while the drain line 18 is still closed. Since the catalyst outlet 15 and the drain 18 are never open at the same time, this cut-off type mechanism in the catalyst outlet conduit allows for the use of only one three position valve instead of requiring an additional valve in the drain conduit 33. Additionally this arrangement insures for simultaneous closing of the drain after washing and opening of the outlet lines. A plug 35 is shown in the drain line rather than a solid seal so that on removal of the plug, access is had to the interior of the chamber for cleaning.

In the operation of the continuous batch sampling process the sequence of steps can be programmed automatically with the use of switches controlling solenoid-operated valves along with the stirrer switch (not shown) operating the stirrer and recorder switch 29. These switches are mounted on a common base with their actuators contacting a common cam shaft (not shown). As is readily apparent to those skilled in the art, individual cams can be designed and arranged on a common, rotating shaft to strike the respective switch actuators and perform the proper sequence of steps involving opening and closing of valves and the stirrer and recorder switch. The following description is made in reference to the arrangement shown in the schematic drawing of FIG. 1 wherein the drain has a separate valve.

FIG. 4 shows the cam lobe design respective to one complete operational cycle or revolution of each cam. All of the valves are normally closed unless contacted by their respective cam lobes. The heavy portion indicates a cam lobe so arranged around the periphery of the cam as to actuate the respective switch and open the respective valve. The cam shaft is driven by a constant speed motor, the speed of which is determined by the needs of the process.

Going from left to right in steps of the process and passage of time, the catalyst slurry inlet valve 13 is first opened along with the drain valve 21 allowing the inlet of catalyst slurry into the sampling chamber 12 and the draining therefrom of slurry liquids. In the next step, the wash step, the catalyst slurry inlet valve 13 is closed and the wash water inlet valve 17 opened allowing inflow of wash water into the chamber to wash the catalyst sample and then pass down the still opened drain (valve 21). When the washing step is completed, the catalyst transfer step commences with the closing of the drain valve 21 and opening of the catalyst outlet valve 23 while wash water still flows into the chamber through still opened wash water inlet valve 17. The stirrer is seen to commence operation here. When the measuring chamber is filled with wash water, the reading step commences with the closing of the wash water inlet valve 17 and catalyst outlet valve 23 (which would be kept opened if convenient). The amplifier recorder and electrode pair switch 29 is closed and the measurement made and recorded. In the next step involving a first drain of the apparatus, the stirrer and recorder are turned off and the measuring cell drain valve 30 opened. A flushing step follows wherein the measuring cell drain valve 30 is temporarily closed and the wash water inlet valve 17 and catalyst outlet valve 23 are opened with the stirrer in operation to fill the measuring cell with wash water to wash any residual catalyst from the walls thereof. When the cell is filled with water a final drain is commenced by opening the measuring cell drain valve 30 while continuing the wash water inflow for a time and then shutting off the wash water inlet valve 17, catalyst outlet 23 valve, stirrer 24, and finally the measuring cell drain valve 30. The apparatus is ready then for the start of a new cycle.

What is claimed is:

1. A method for measuring the activity of a finely-divided hydrogenation catalyst comprising forming a slurry of distilled water and said catalyst bearing adsorbed hydrogen, immersing in said slurry an oxidation-reduction pair consisting of a measuring electrode having an affinity for the hydrogen adsorbed on said catalyst and a reference electrode having an electrode potential above that of the measuring electrode, and measuring the voltage produced by the oxidation-reduction pair as a measurement of the catalyst activity.

2. A method for measuring the activity of a finely-divided Raney nickel hydrogenation catalyst comprising forming a slurry of distilled water and said catalyst bearing adsorbed hydrogen, immersing in the slurry an oxidation-reduction pair consisting of a platinum measuring electrode and a calomel reference electrode, and measuring the voltage produced by the oxidation-reduction pair as a measurement of the catalyst activity.

3. A method for measuring the hydrogen adsorption activity of a finely-divided hydrogenation catalyst bearing adsorbed hydrogen, which method comprises forming a slurry of the finely-divided catalyst to be tested in an inert electrically conductive medium, immersing in said slurry an oxidation-reduction electrode pair consisting of a measuring electrode having an affinity for the hydrogen adsorbed on said catalyst and a reference electrode having an electrode potential above that of the measuring electrode, and measuring the voltage produced by the oxidation-reduction pair as a measurement of the catalytic activity.

4. A method for measuring the activity of a finely-divided hydrogenation catalyst in a production process, which method comprises the steps of periodically directing a sample of process fluid containing said finely-divided catalyst bearing adsorbed hydrogen from a process stream into a washing container; washing said sample for a time sufficient to separate substantially all process fluid components other than said adsorbed hydrogen from the catalyst; adding a quantity of an inert electrically conductive fluid to the washed catalyst to form a catalyst slurry; directing said catalyst slurry into a measuring container having a measuring electrode having an affinity for the hydrogen adsorbed on said catalyst and a reference electrode; developing between said electrodes a potential proportional to the activity value of said catalyst; and translating said potential into indicia representative of the catalyst activity.

5. A method for measuring the activity of a finely-divided Raney nickel hydrogenation catalyst in a production process, which method comprises the steps of periodically directing a sample of process fluid containing said finely-divided Raney nickel catalyst bearing adsorbed hydrogen from a process stream into a washing container; washing said sample for a time sufficient to separate substantially all process fluid components other than said adsorbed hydrogen from the Raney nickel catalyst; adding a quantity of an inert electrically conductive aqueous fluid to the washed catalyst to form a catalyst slurry; directing said catalyst slurry into a measuring container having an oxidation-reduction electrode pair consisting of a platinum measuring electrode and a calomel reference electrode; developing between said electrodes a potential proportional to the activity value of said catalyst; and translating said potential into indicia representative of the catalyst activity.

6. A method according to claim 5 wherein the quantity of inert electrically conductive aqueous fluid added to the washed catalyst to form a slurry is distilled water.

References Cited by the Examiner
UNITED STATES PATENTS

| | | | |
|---|---|---|---|
| 2,192,123 | 2/40 | Bennett | 204—195 |
| 2,289,589 | 7/42 | Pomeroy | 204—195 |
| 2,773,009 | 12/56 | Earhart et al. | |
| 2,782,151 | 2/57 | Suthard. | |
| 2,870,077 | 1/59 | Kushner | 204—195 |
| 2,870,078 | 1/59 | Hood | 204—195 |
| 2,886,497 | 5/59 | Butler. | |
| 2,943,984 | 7/60 | Gullett. | |
| 3,003,932 | 10/61 | Frey et al. | 204—195 |
| 3,084,030 | 4/63 | Ballon et al. | 204—195 |

FOREIGN PATENTS 1,074,015   1/60   Germany.

OTHER REFERENCES

Plant: "Analytical Chemistry," vol. 24 (1952), pages 1304–1306.

JOHN H. MACK, *Primary Examiner.*

JOSEPH REBOLD, MURRAY TILLMAN, WINSTON A. DOUGLAS, *Examiners.*